United States Patent [19]

Martin et al.

[11] Patent Number: 4,639,138

[45] Date of Patent: Jan. 27, 1987

[54] FIBER-OPTIC ROTATION RATE SENSOR HAVING DUAL INTERFEROMETER LOOPS

[75] Inventors: James M. Martin, Orlando; William S. Brockett, Mt. Dora; Ronald R. Selleck, Winter Park; Michael G. Croteau, Orlando, all of Fla.

[73] Assignee: Martin Marietta Corporation, Bethesda, Md.

[21] Appl. No.: 665,474

[22] Filed: Oct. 29, 1984

[51] Int. Cl.⁴ .................. G01B 9/02; G01C 19/64
[52] U.S. Cl. .................................................. 356/350
[58] Field of Search .................... 356/350; 350/358

[56] References Cited

U.S. PATENT DOCUMENTS 4,444,503  8/1984  Schiffner .................. 356/350
4,565,983  1/1986  Gratze ...................... 350/358

FOREIGN PATENT DOCUMENTS 0000610  1/1984  Japan ....................... 356/350

Primary Examiner—Vincent P. McGraw
Assistant Examiner—S. A. Turner
Attorney, Agent, or Firm—Gay Chin; William J. Iseman

[57] ABSTRACT

A fiber optic rotation rate sensor employs two fiber loop interferometers. Two Sagnac fiber optic interferometers are interleaved such that both fibers are contained in each each interferometer. A coherent light beam at one frequency is proprogated in only one of the fibers, and an opticl beam at another frequency is proprogated in the other fiber. The beam emerging from one of the fibers is combined with the beam emerging from the other of the fibers for each of the two ends of each fiber to produce a pair of interference signals each having a frequency equal to the difference between the two light beam frequencies. The relative phase of these two signals is then determined to provide an indication of the rate of angular rotation of the fiber optic loops, and this determination is independent of any temperature-related characteristics that produce offset phase errors.

13 Claims, 9 Drawing Figures

FIBER-OPTIC ROTATION RATE SENSOR HAVING DUAL INTERFEROMETER LOOPS

The Government has rights in this invention pursuant to Contract No. DASG60-80-C-0050 awarded by the Department of the Army.

BACKGROUND OF THE INVENTION

The present invention is generally directed to rotation rate sensors, or gyroscopes, and is specifically concerned with a fiber-optic rotation rate sensor that is particularly suited for use in the mid-course guidance and roll stabilization of missiles.

Gyroscopes have long been in use to detect rotation about an axis. The earliest gyroscopes were of the spinning mass, mechanical variety. While these gyroscopes were generally suitable for use in such applications as course corrections on ships, for example, they are not capable of meeting the dynamic performance requirements associated with mid-course guidance and roll stabilization in missiles, particularly small interceptor missiles. Among the limitations associated with spinning mass gyros are the fact that they have moving parts which can wear out, and they are sensitive to the forces of gravity, shock and vibration. Furthermore, a missile might experience temperature variations in the range of −65° C. to 85° C., either in storage or while in use, and the mechanical gyros do not operate readily over such a wide range. In addition, their response time is severely limited.

A second type of gyroscope is an optical version that is commonly known as a ring laser gyro. While offering advantages over the mechanical type of gyroscope, the ring laser gyro is also not without its attendant limitations that restrict its suitability for use in such applications as missile guidance and stabilization. Included in such limitations are the complexity of its construction, relatively large size, alignment considerations, high voltage requirements, gas sealing problems, and the need for mechanical dithering to prevent lock in.

Furthermore, a missile can lay dormant in a silo or other storage facility for a considerable period of time, e.g., up to 10 years, before it is put to use and the gyroscope is required to function. Neither spinning mass nor ring laser gyroscopes have proven to be dependable under such long dormancy conditions.

A third type of gyroscope, and the one which is most practically suited for use in missile guidance types of applications, is the fiber-optic gyroscope. This type of gyroscope operates in accordance with the principle known as the Sagnac effect. Basically, this principal states that when two beams of light travel in opposite directions around an enclosed area such as a loop, any rotation of the loop about its axis will produce a relative phase difference between the two beams, and the magnitude of this phase difference will be proportional to the rate of angular rotation about the loop axis. In implementing the Sagnac effect, a fiber-optic gyroscope employs an optical fiber loop whose axis is parallel to the axis about which rotation is to be measured. Two light beams are fed into the respective ends of the loop, and any relative phase shift between them is detected by measuring the interference of the beams on a detector.

The intensity of the measured interference pattern is given by the equation:

$$I = I_0(1 - \cos K\Omega) \quad (1)$$

where $I_0$ is a peak, or initial beam intensity, K is the Sagnac scale factor and $\Omega$ is the rate of angular rotation. The Sagnac scale factor K is defined as:

$$K = \frac{8\pi NA}{c\lambda} \quad (2)$$

where N is the number of times each beam travels around the loop area A normal to the axis of rotation, c is the speed of light and $\lambda$ is the wavelength of the light in the beam. For a fiber optic coil, N can be made quite large so that the area A can be small while maintaining high sensitivity.

When measuring relatively small rates of angular rotation, the sensitivity of the fiber-optic gyroscope is low if the cosine dependent measurement of Equation (1) is utilized. More particularly, at a zero input rate, the slope of the cosine function is zero and it varies only slightly with small changes around zero. In addition, the cosine function is symmetric about the zero axis, so that the magnitude of the intensity measured according to equation (1) is independent of the direction of rotation. To compensate for this situation and to achieve greater sensitivity of the measurement around a zero input rate, two approaches have been utilized. One is to the shift the phase of one beam 90° relative to the other, so that the output signal is sine-dependent rather than cosine-dependent. The other approach is to shift the frequency of one beam relative to the other.

The present invention is concerned with this latter approach, and is particularly directed to output phase errors that can arise in a practical implementation of this approach. More particularly, when modulation is applied which shifts the frequency of one light beam relative to the other, the output phases, $\phi_1$ and $\phi_2$ of the two beams are respectively given by:

$$\phi_1 = \omega_1 \left( t_1 - \frac{n_1 l}{c} \right) \quad (3)$$

$$\phi_2 = \omega_2 \left( t_2 - \frac{n_2 l}{c} \right)$$

where $\omega_1$, $\omega_2$, are the respective angular frequencies of the light, $n_1$, $n_2$ is the refractive index of the fiber, accounting for dispersion, l is the length of the fiber, and $t_1$ and $t_2$ are defined as $t_1 = t + \Delta t$ and $t_2 = t - \Delta t$ where t is the nominal time it takes the beam to traverse the loop and $\Delta t$ is the time delay introduced by the Sagnac Effect. If it is assumed that small modulation frequencies are used and hence $n_1 \approx n_2 = n$, the output phase difference between the two beams after propogating through the loop is given by:

$$\phi_1 - \phi_2 = (\omega_1 - \omega_2)\left( t - \frac{nl}{c} \right) + (\omega_1 + \omega_2)\Delta t \quad (4)$$

The last term appearing in this expression will be recognized as the Sagnac effect phase shift. The first term defines an added phase offset that is due to the phase modulation, i.e., $\omega_1 \neq \omega_2$. Accordingly, the output signal from the fiber optic gyro is subject to variations in fiber length, fiber index of refraction and modulation. This term can be significant because of the sensitivity of fiber length and index of refraction to temperature and stress. Attempts at using a non-fiber optical reference channel do not compensate for this term. Although the non-fiber optical reference channel may compensate for phase errors occuring within the modulator, because it is optically different from the fiber optic channel it will generally not behave the same.

OBJECTS AND BRIEF STATEMENT OF THE INVENTION

It is an object of the present invention to eliminate phase offset errors that can arise in optical fiber gyroscopes utilizing frequency modulation. In particular, it is an object of the present invention to provide a novel optical fiber gyroscope whose output signal is independent of such temperature dependent parameters as index of refraction and fiber length, so as to eliminate the thermal drift sensitivity of the gyro.

Briefly, in accordance with the present invention these objects are achieved with the use of a dual fiber loop interferometer arrangement. Two Sagnac fiber optic interferometers are interleaved such that both fibers are contained in each interferometer. With this approach the optical beam at one frequency is propagated in only one of the fibers, and the optical beam at the other frequency is propagated in only the other fiber. When the phases of the two beams are compared, the phase bias term cancels, thus resulting in an output signal that is dependent only on the rate of angular rotation of the fiber optic loops.

In accordance with another aspect of the invention, the resolution of the phase comparison can be increased without requiring high frequency clocking signals by means of a vernier scaling technique.

The implementation of these features of the invention in a practical embodiment is described hereinafter with reference to the accompanying drawings.

DETAILED DESCRIPTION OF THE ILLUSTRATED EMBODIMENT

Figure 1:
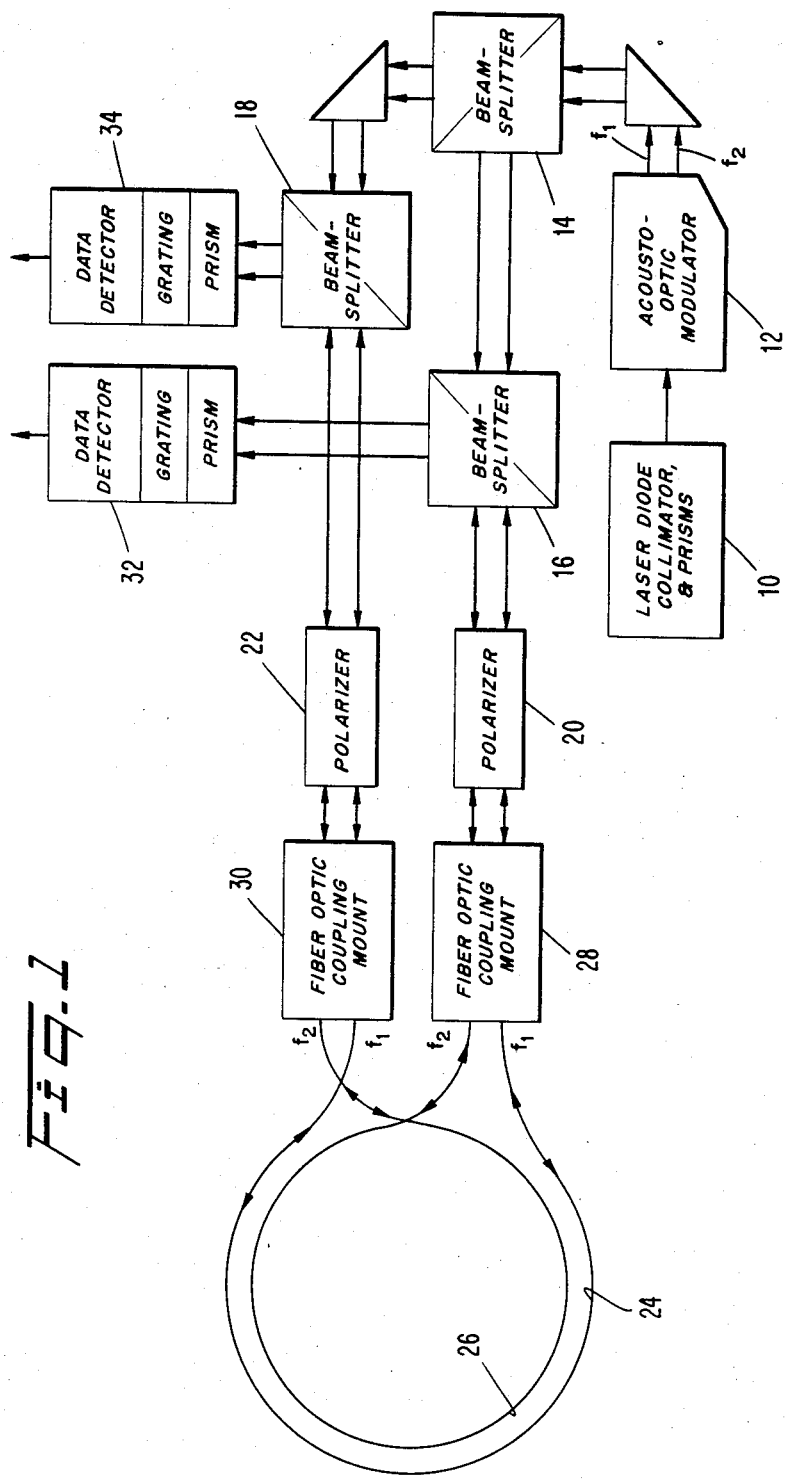
FIG. 1 is a schematic representation of the optical portion of a fiber optic rate gyro incorporating the principles of the present invention.

As discussed previously, one of the features that characaterizes the present invention is the use of dual fiber optic loop interferometers to cancel the phase offset errors that may be inherent to gyros which use frequency modulation to increase sensitivity. Referring to FIG. 1, the output beam from a laser 10 is provided to an acousto-optic modulator 12 which generates two frequency-shifted light beams. The laser 10 is preferably a linearly polarized laser diode, whose output beam can be passed through Risley prisms to align it to the modulator.

The two frequency shifted beams from the modulator 12 are presented to a beam-splitter 14 to form two sets of beams. These beams pass through a pair of dual-channel beam-splitters 16 and 18 and are presented to a pair of polarizers 20 and 22 which eliminate any residual light in the undesired direction of polarization. These beams are then coupled into the ends of a pair of fiber optic loops 24 and 26 by means of fiber optic couplers 28 and 30. The coupling arrangement is such that the beam at one frequency $f_1$ enters into both ends of the loop 24, and the beam at the other frequency $f_2$ is coupled into both ends of the other fiber optic loop 26. With this arrangement, each fiber propagates beams of only one frequency, and the beams pass through the fiber in each direction, i.e., both clockwise and counter-clockwise.

After the beams propogate around the fibers, they return through the couplers 28 and 30, the polarizers 20 and 22 (which reject residual light coupled into the undesired polarization), and then the beams reflect off the dual beam-splitters 16 and 18 to a pair of data detectors 32 and 34.

One of the detectors, e.g., 32, receives the beam at frequency $f_1$ that was traveling around the loop 24 in the counterclockwise direction and the beam of frequency $f_2$ that was traveling around the loop 26 in the clockwise direction. The phases of the two beams received at this detector can be written as follows:

$$\phi_{1ccw} = \omega_1 \left( t - \frac{n_1 l_1}{c} \right) - \omega_1 \Delta t \tag{5}$$

$$\phi_{2cw} = \omega_2 \left( t - \frac{n_2 l_2}{c} \right) + \omega_2 \Delta t$$

The other detector receives the other two beams that have been traveling around the loops, whose phases can be similarly written as:

$$\phi_{1cw} = \omega_1 \left( t - \frac{n_1 l_1}{c} \right) + \omega_1 \Delta t \tag{6}$$

$$\phi_{2ccw} = \omega_2 \left( t - \frac{n_2 l_2}{c} \right) - \omega_2 \Delta t$$

The two beams in each detector produce an interference pattern whose intensity is measured in accordance with equation 1. This measured intensity is converted into an electrical signal, which appears as a sinusoidal signal having a frequency equal to the difference of the two frequencies $f_1$ and $f_2$.

To determine the Sagnac effect, and hence the rate of angular rotation of the fiber optic loops, the phase difference between the two output signals from the detectors is determined. This phase difference is defined as $$\phi_{32} - \phi_{34} = 2(\omega_1 + \omega_2)\Delta t = (K_1 + K_2)\Omega \qquad (7)$$

where $t = K\Omega/\omega$, is the rotation rate, and $K_1 + K_2$ is the net scale factor for the two fibers. As can be seen, no offset phase term appears in the resultant output signal. Since the two interferometers share the two optical fiber loops, it is not necessary that $n_1 l_1 = n_2 l_2$. The only constraint upon the lengths of the fibers is that their optical length difference be less than the laser coherence length. For example, the coherence length of a single mode diode laser such as Laser Diode Labs SCW-21 or the Hitachi HLP 3000 is 0.1 to 10 meters. Matching the length of the two optical fiber loops within a 0.1 meter tolerance is not difficult to achieve using presently available techniques, such as delay line measurement.

Where matching of the optical lengths of the fiber is feasible, i.e. $n_1 l_1$ can be made approximately equal to $n_2 l_2$, the two frequency shifted beams can be coupled into the two loops in a different fashion. More specifically, each fiber optic loop 24 or 26 is connected to only one of the optical channels and detectors, respectively. With this arrangement, a light beam at each frequency passes in opposite directions around each fiber. In addition, the fibers are arranged so that the direction of travel of each frequency is opposite in the two fibers, e.g. a beam at frequency $f_1$ travels in the clockwise direction in loop 24 and in the counterclockwise direction in loop 26, and vice versa with respect to the beam at frequency $f_2$.

In this case, equations (5) and (6) become $$\phi_{1ccw} = \omega_1 \left( t - \frac{n_1 l_1}{c} \right) - \omega_1 \Delta t \qquad (5')$$

$$\phi_{1cw} = \omega_2 \left( t - \frac{n_1 l_1}{c} \right) + \omega_2 \Delta t$$

and $$\phi_{2cw} = \omega_1 \left( t - \frac{n_2 l_2}{c} \right) + \omega_1 \Delta t \qquad (6')$$

$$\phi_{2ccw} = \omega_2 \left( t - \frac{n_2 l_2}{c} \right) - \omega_2 \Delta t$$

Accordingly, the phase difference between the two output signals from the detectors then appears as:

$$\phi_{32} = \phi_{34} = (\phi_{1cw} - \phi_{1ccw}) - (\phi_{2ccw} - \phi_{2cw}) = \qquad (7')$$

$$2(\omega_1 + \omega_2)\Delta t + (\omega_2 - \omega_1) \left[ \frac{n_2 l_2 - n_1 l_1}{c} \right]$$

If $n_2 l_2 = n_1 l_1$, then the latter term in equation 7' (related to frequency difference) cancels to provide the same result as the previously-described embodiment. This latter embodiment has the advantage of eliminating any laser coherence requirement.

Another advantage associated with the use of the dual fiber loops of either embodiment is the matched optical channels. The detectors each receive equal flux levels, and consequently the processing electronics for each channel can be identical in design and matched. With identical optical and electrical channels, ambient temperature sensitivities cancel. Further, locating identical optical elements in single mounts, or combining them in one piece, helps to reduce thermal gradient sensitivity.

Figure 2:
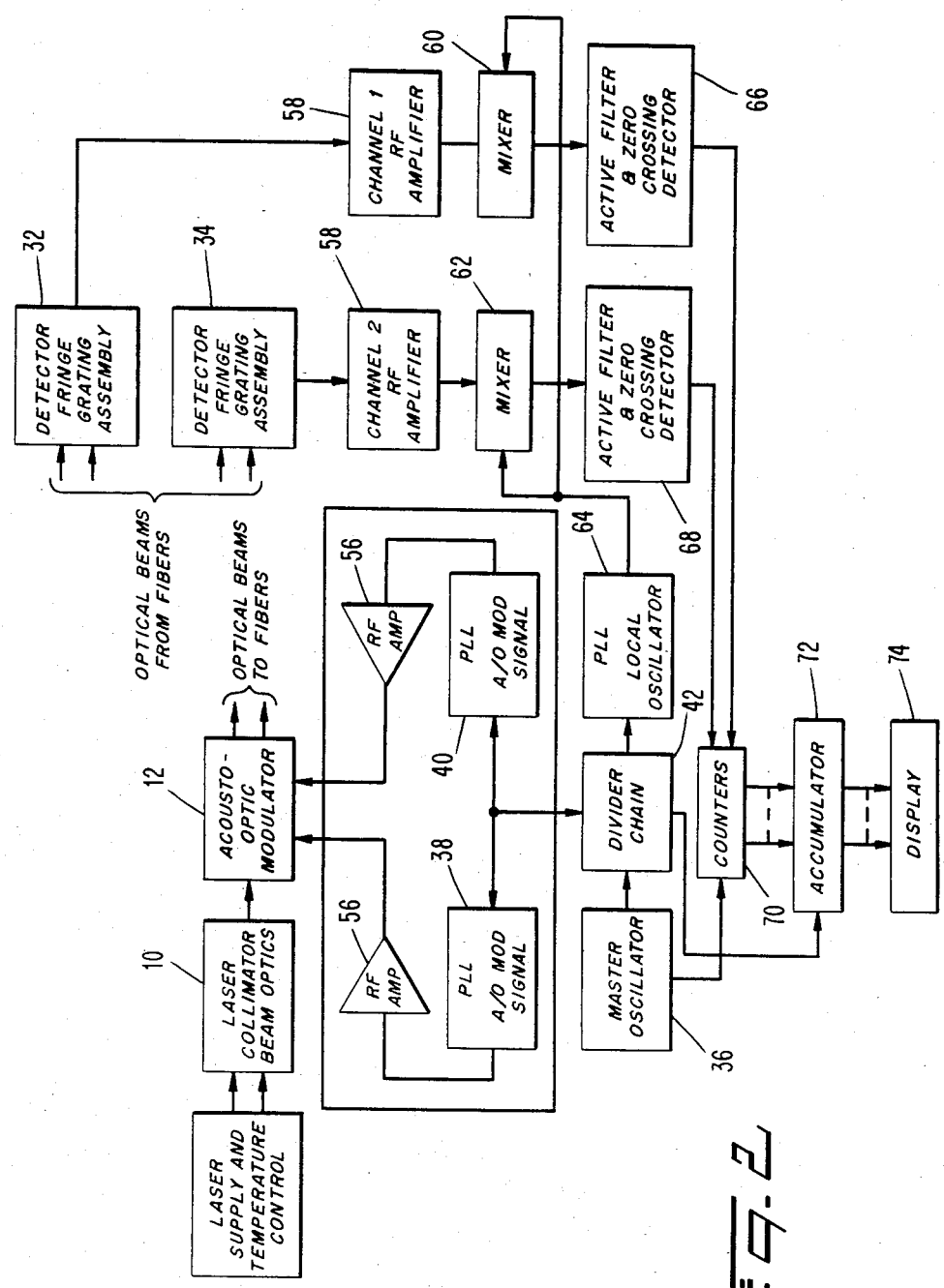
FIG. 2 is a block electrical diagram generally representing the electrical system for generating and analyzing the signals produced within the gyro of FIG. 1.
Figure 3:
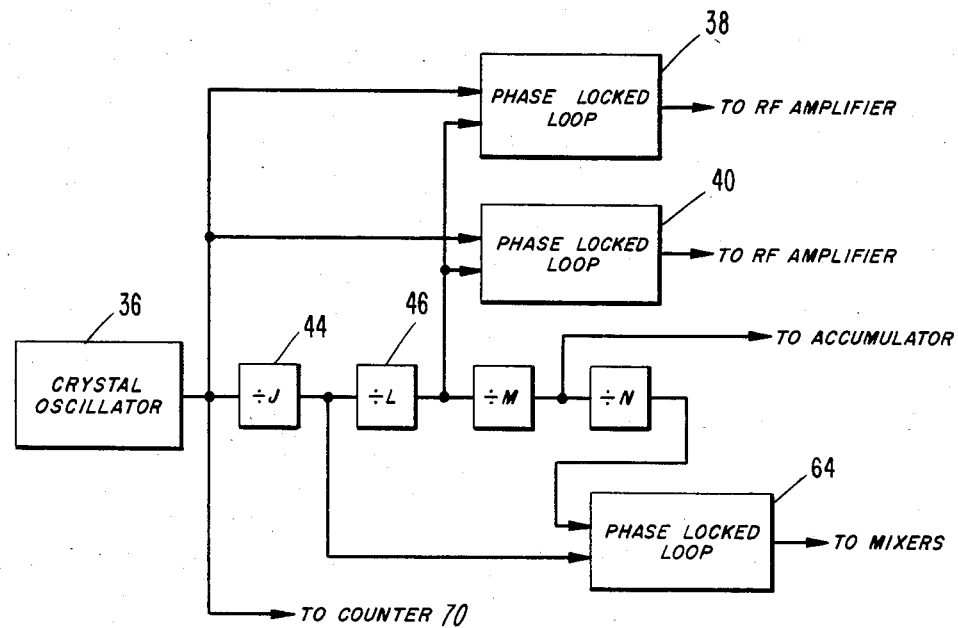
FIG. 3 is a more detailed block diagram of the timing system for the electrical circuit of FIG. 2.

An electronic circuit for producing the required power for operation and processing the optical sensor outputs is illustrated generally in FIG. 2. All timing signals for the system are derived from a stable master oscillator 36, which drives a pair of phase locked loops 38 and 40 through a divider chain 42. Referring to FIG. 3, the clocking network for the phase locked loops is illustrated in greater detail. The output pulses from the master oscillator 36 are directly applied to one input of each of the phase locked loops. These output pulses are also suitably divided by means of a pair of frequency dividers 44 and 46, and the lower frequency pulses that result from this division are supplied to a second input of each of the two phase locked loops.

Figure 4:
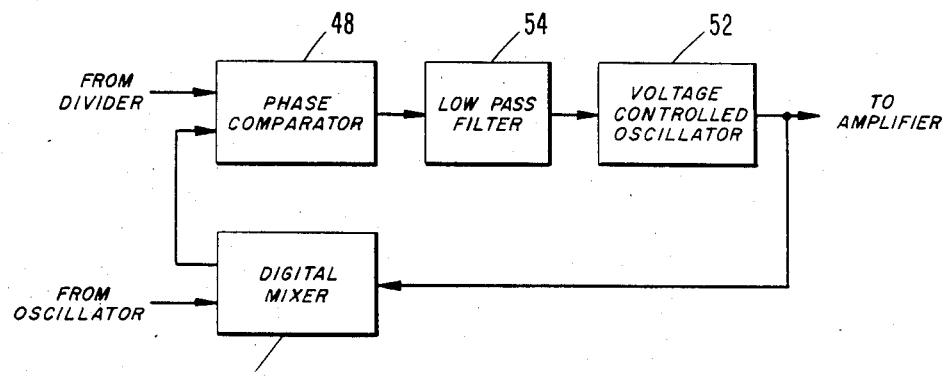
FIG. 4 is a detailed block diagram of the phase lock loops that are employed in the electrical system of FIG. 2.

Each of the phase locked loops can be generally configured as illustrated in FIG. 4. Referring thereto, the higher frequency pulses from the oscillator 36 are applied to one input terminal of a digital mixer 50. The other input terminal of the digital mixer receives an output signal from a voltage controlled oscillator 52. The phase comparator 48 receives the lower frequency pulses that are supplied by the dividers 44 and 46, as well as the difference frequency output signal from the digital mixer 50. The output signal from the phase comparator 48 is filtered in a low pass filter 54 and presented as the control signal to the voltage controlled oscillator 52. The output signal from the voltage controlled oscillator 52 forms the output signal of the phase locked loop.

Referring again to FIG. 2, the voltage controlled oscillators in the two phase locked loops 38 and 40 are suitably selected to provide two loop output frequencies $f_1$ and $f_2$. For example, these two frequencies might be 92.25 MHz and 71.75 MHz, respectively. The output signals from these two phase locked loops are supplied to a pair of RF amplifiers 56 which drive the acousto-optic modulator 12 to produce the two beams of light at the respective frequencies. These beams of light are respectively applied to the two fiber optic loops 24 and 26, as discussed previously.

The difference frequency between the two output signals from the phase locked loops 38 and 40 appears as the output signal from each of the two detector assemblies 32 and 34. These signals are amplified by RF amplifiers 58. These signals are then applied to respective mixers 60 and 62 which effectively function to divide the frequency of the detector output signals while maintaining the proper phase information. The output frequency from the mixers is selected as a fraction of the master oscillator output frequency so that suitable resolution is provided in the phase delay measurement. For example, if the output frequency of the master oscillator 36 is 82.00 MHz, and the difference frequency signal that appears at the output of each of the two detector assemblies 32 and 34 is 20.50 MHz, the output signal from the mixers 60 and 62 can be selected to be 80.078 KHz so that exactly 1024 oscillator pulses appear during each cycle of the mixer output signals. To provide this division, the digital mixers 60 and 62 receive a reference signal from a third phase locked loop 64 that functions as a local oscillator. In the example given above, the output frequency of this local oscillator would be 20.420 MHz.

The frequency divided output signals of the mixers are presented to a pair of active filter zero crossing detector circuits 66 and 68. These detectors convert the band pass filtered sine wave output signals of the mixers to square waves by means of zero reference voltage comparators. The two square waves that are produced by the detectors are sent to counters 70, which also receive clock signals from the master oscillator 36.

Figure 5:
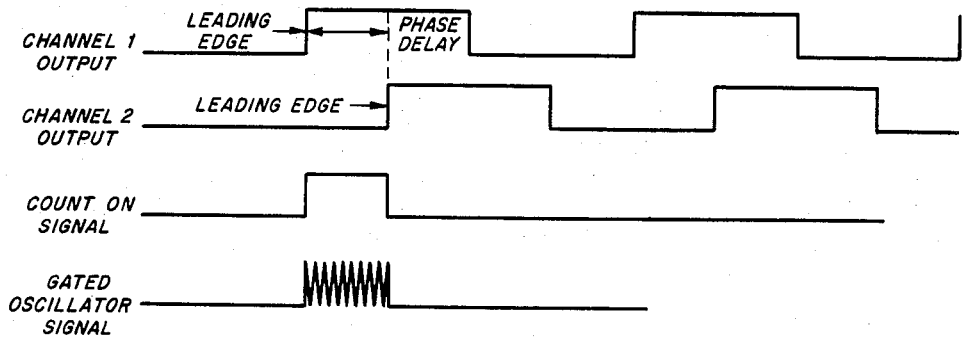
FIG. 5 is a timing diagram illustrating the operation of the subsystem for comparing the phase delay of the two detector output signals.

The measurement of the phase delay between the two output signals from the detector assemblies 32 and 34 is divided into two parts in order to maintain a high data rate. The first part is the measurement of the fractional cycle of delay, which takes place within one of the counters 70. Referring to FIG. 5, the first leading edge which appears in the output signal from one of the two zero crossing detectors 66 and 68 functions to turn the counter on, so that it begins counting clock pulses from the oscillator 36. The second leading edge from the other zero crossing detector turns the counter off, and the number of clock pulses that are counted between the two leading edges provides an indication of the phase delay between the two detector assembly output signals. For example, in the above-described embodiment wherein 1024 clock pulses are produced during each cycle of the digital mixer output signal, each pulse that is counted within the counter would represent 360/1024 degrees of phase displacement between the two output signals. The resulting count in the counter is provided to an accumulator 72 which stores this count and averages it with subsequent counts to provide a more accurate measurement of the phase delay, and hence the angular rate of rotation of the optical fiber loops 24 and 26. The measured phase delay, or the calculated rate of angular rotation, can be displayed on a suitable display unit 74.

The second part of the phase measurement involves determination of the direction of rotation. This function is carried out by labeling one set of leading edges, e.g., those from zero crossing detector 66, as a reference set. The number of leading edges produced by each zero crossing detector are counted in another one of the counters 70, beginning with an arbitrary point in time and continuing for a period of time such that the total number of cycles of delay exceeds one cycle of the mixer output signal. After this period of time, the number of leading edges produced by each zero crossing detector are compared with one another. If the number of leading edges from the reference channel is higher than the number from the other channel, the determination can be made that the reference channel is leading the other channel in phase and thus the loops are rotating in a certain direction. Conversely, a lower number of leading edges from the reference channel indicate that it is lagging in phase and the loops are rotating in the other direction.

As noted previously, the resolution of the phase delay determination is related to the fractional relationship between the frequency of the digital mixer output signals and the master oscillator signal. In the example set forth previously, this resolution is one part in 1024. This resolution can be further increased by means of a vernier scaling technique. Generally, vernier scaling involves the comparison of the gradations on one scale against those of another scale having a different index, i.e., a different spacing between gradations.

Figure 6:
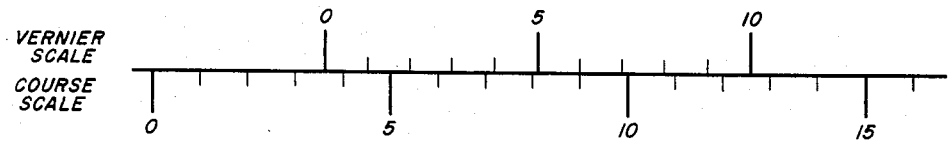
FIG. 6 is a scale illustrating the general principle of vernier scale measurement.

FIG. 6 represents course and vernier scales that might appear on a vernier caliper or similar such measuring instrument. The gradations on the course scale are spaced in accordance with the unit of measurement, e.g. adjacent gradations may be one millimeter or one inch apart. The gradations on the vernier scale located directly adjacent the course scale are spaced by a smaller distance defined as x−1/x times the unit distance, where x is the desired number of increments of the unit measurement represented on the course scale. For example, if the course scale represents millimeters and measurement is desired in tenths of a millimeter, x would be equal to 10. Similarly, if the course measurement is made in terms of inches, x could desirably be 8, 16 or 32.

In order to measure quantity with the vernier scale, the number of course markers between 0 on the course scale and 0 on the vernier scale are first counted. In the example of FIG. 6, this number is 3. Then, the fraction of the course count is determined by counting the number of vernier scale marks that occur between the vernier 0 and the first coincidence between a vernier scale mark and a course scale mark. In the illustrated example, vernier scale mark 6 coincides with the course scale mark 9. Accordingly, the measurement represented in FIG. 6 is equal to 3.6 units.

Figure 7:
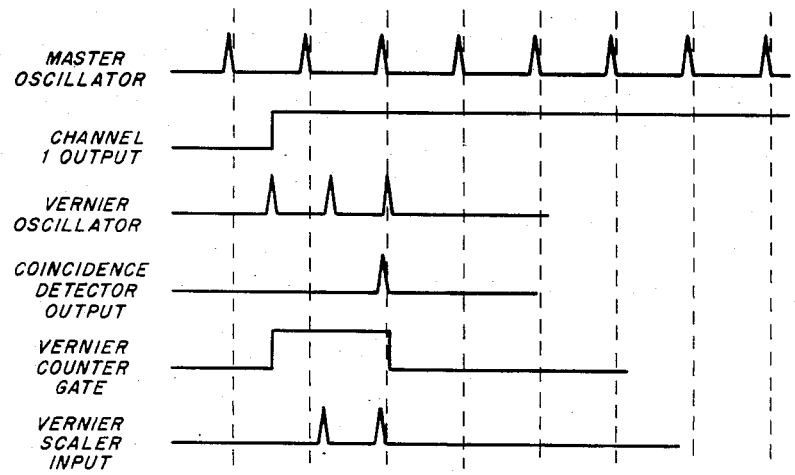
FIG. 7 is a timing diagram illustrating the concept underlying the electronic vernier scale approach to the improvement of resolution.
Figure 8:
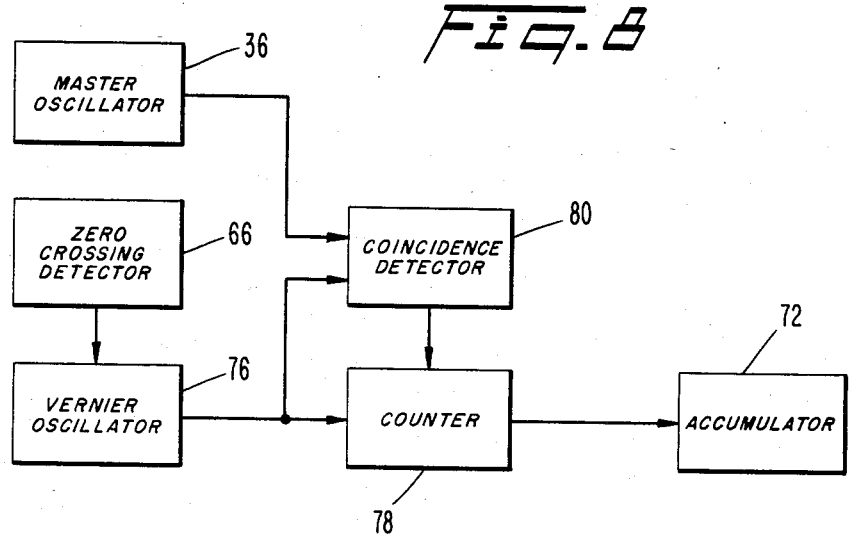
FIG. 8 is a block diagram of the vernier measurement system.

A similar such approach can be used in the electronic measurement of the phase displacement between the two detector output signals. The course scale corresponds to the operation of gating one of the counters 70 on and off to count pulses from the master oscillator 36. Referring to FIGS. 7 and 8, the implementation of the fractional measurement can be carried out by turning on a stable vernier oscillator 76 upon the occurrence of the second leading edge from the two zero crossing detectors 66 and 68. The number of pulses that are produced by the vernier oscillator 76 are counted in a counter 78 until a coincidence detector 80 indicates that coincidence has occurred between pulses from the master oscillator 36 and those from the vernier oscillator 76. The frequency of the output signal from the vernier oscillator is related to that of the master oscillator according to the formula:

$$f_V = f_M \left( \frac{x}{1-x} \right) \tag{8}$$

where $f_V$ is the output frequency of the vernier oscillator 76, $f_M$ is the output frequency of the master oscillator 36, and x is the incremental unit of measurement as defined previously. For example, x could be 128 ($2^7$) so that, in the previously described example wherein 1024 ($2^{10}$) pulses are generated by the master oscillator 36 during each cycle of the square wave output signal from the zero crossing detectors 66 and 68, the phase delay between the two output signals can be measured to one part in 131,072 ($2^{17}$). In this case, the output frequency of vernier oscillator 76 is 82.645 MHz.

Figure 9:
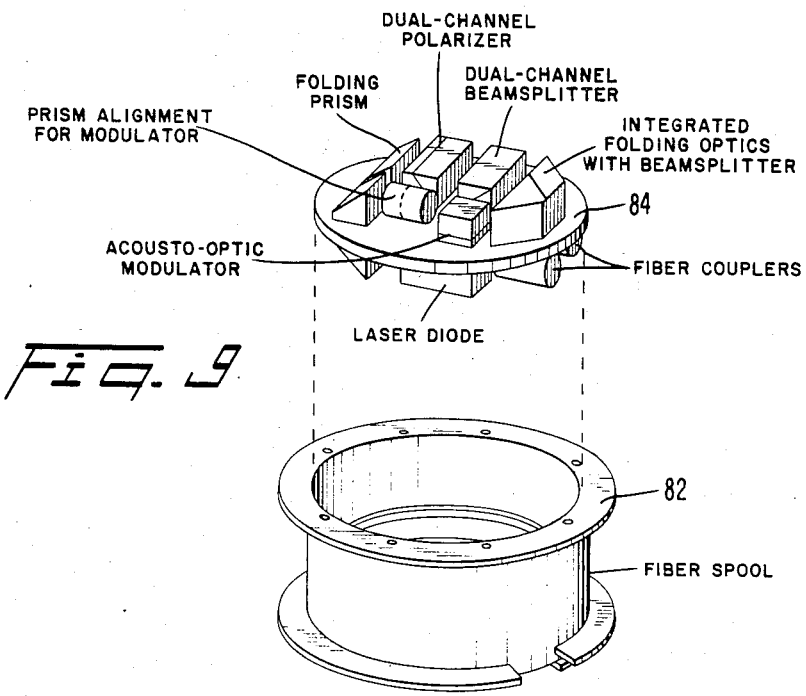
FIG. 9 is a perspective view illustrating a preferred arrangement of the components for the fiber optic gyro.

A preferred packaging arrangement for the components that make up a fiber optic gyroscope incorporating the present invention is illustrated in FIG. 9. The gyroscope assembly basically consist of two parts: (1) the fiber spool and fiber, and (2) an optical base plate which mounts the laser diode, detectors, modulator and other optics. The spool 82 preferably holds about one km of optical fiber having a 200 micrometer jacket diameter with a 50 micrometer thickness of tape layered between adjacent fiber layers, to stablize the fibers. Such a spool would have a height of about 30 millimeters and an overall diameter of 90 millimeters. The height of the fiber wrap is approximately 2.54 cm, giving 1770 loops per fiber for each of the two main optical loops. The fibers are preferably wrapped bifilarly to insure equality of thermal and mechanical environment.

The remaining components of the optical system schematically illustrated in FIG. 1 are mounted on an optic base plate 84 in such a manner that the optical path is folded to provide a compact assembly and increase stability. The laser diode and collimator are located below the base plate and emit a beam to the left, as viewed in FIG. 9, to a folding prism. The prism folds the beam up to the top of the base plate through a pair of alignment prisms, and then onto the modulator. There, the beam is split into two frequency shifted beams which pass through the dual channel beam-splitter and polarizer. Next, a prism folds the beam under the base plate to the coupling lenses which are connected to the terminations of the fibers wrapped around the spool. The beams which pass through the fibers return through the coupler, the folding prism and the polarizer and are reflected off the dual beam-splitter onto the detectors which are located immediately above the beam-splitter.

Preferably, three such assemblies respectively oriented along the X, Y and Z axes are mounted within a missile to provide stabilization and guidance in all dimensions.

It will be appreciated by those of ordinary skill in the art that the present invention can be embodied in other specific forms without departing from the spirit or the essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A fiber optic rotation rate sensor, for measuring angular rotation rate about an axis, comprising:
   a first fiber-optic loop that is disposed to rotate about said axis;
   a second fiber-optic loop disposed to rotate about said axis with said first fiber-optic loop;
   means for generating coherent light at a first frequency and introducing said light into each end of said first fiber-optic loop so that two beams of light at said first frequency travel around said first loop in opposite directions;
   means for generating coherent light at a second frequency and introducing said light into each end of said second fiber-optic loop so that two beams of light at said second frequency travel around said second loop in opposite directions;
   a first detector which receives the light beam emerging from one end of each of said two fiber-optic loops and produces a first output signal indicative of the difference in frequency between said first and second frequencies;
   a second detector which receives the light beam emerging from the other end of each of said two fiber-optic loops and produces a second output signal indicative of the difference in frequency between said first and second frequencies; and
   means for comparing said first and second output signals and generating a signal indicative of the phase difference between said output signals.

2. The sensor of claim 1 wherein said light generating means comprise a laser source, an acousto-optic modulator receiving the light produced by said laser source, and means for controlling said acousto-optic modulator to generate two light beams at said first and second frequencies, respectively.

3. The sensor of claim 2 wherein said controlling means includes an oscillator and two phase-locked loops which respectively generate control output signals at said first and second frequencies from the output signal of said oscillator.

4. The sensor of claim 1 wherein said comparing means includes a source of clock pulses and a counter that is enabled by one of said first and second output signals to count said clock pulses and disabled by the other of said output signals.

5. The sensor of claim 4 further including an oscillator for producing vernier pulses at a frequency greater than the frequency of said clock pulses, means for generating said vernier pulses in response to one of said output signals, a counter for counting said vernier pulses, and a coincidence detector to halt the counting of vernier pulses upon detection of coincidence between a vernier pulse and a clock pulse.

6. The sensor of claim 4 wherein said first and second output signals are periodic signals, and said comparing means further includes means for comparing the number of cycles in said two output signals over a length of time to determine direction of angular rotation.

7. A fiber-optic rotation rate sensor, comprising:
   first and second fiber-optic loops disposed to rotate about a common axis;
   means for generating two pairs of light beams at two respective frequencies and coupling said light beams into the ends of said fiber-optic loops;
   means for detecting the interference pattern produced by one of the beams emerging from said loops at one of said frequencies and one of the beams emerging from said loops at the other of said frequencies;
   means for detecting the interference pattern produced by the other two beams emerging from said loops; and
   means for comparing the relative phase difference between the two detected interference patterns.

8. The rotation rate sensor of claim 7 wherein the light beams at said one frequency propogate only in said first loop and the light beams at said other frequency propogate only in said second loop.

9. A method for detecting rate of rotation about an axis, comprising the steps of:
   propogating light at a first frequency in each of two opposite directions around a loop that can rotate about said axis;
   propogating light at a second frequency in each of said two directions around said loop;
   detecting the two interference patterns that are produced by each pair of light beams comprising one beam propogating in said loop in one direction and a light beam propogating in said loop in the opposite direction; and
   measuring the relative phase displacement of the two interference patterns by converting said two interference patterns into square wave signals, generating clock pulses at a predetermined frequency, and then counting the number of clock pulses that occur between a leading edge in one of the square wave signals and a leading edge in the other square wave signal.

10. The method of claim 9 further including the steps of generating vernier pulses at a second frequency higher than said predetermined frequency upon occurrence of one of said leading edges, detecting coincidence between a clock pulse and a vernier pulse, and counting the number of vernier pulses between said one leading edge and the detected coincidence.

11. A fiber optic rotation rate sensor, for measuring angular rotation rate about an axis, comprising:

first and second optical fibers disposed in a loop that rotates about said axis;

means for generating coherent light at a first frequency and introducing said light into at least one of said optical fibers so that two beams of light at said first frequency travel around said loop in opposite directions;

means for generating coherent light at a second frequency and introducing said light into at least the other of said optical fibers so that two beams of light at said second frequency travel around said loop in opposite directions;

a first detector which receives a light beam that has propogated around said loop in one direction and a light beam that has propogated around said loop in the opposite direction and produces a first output signal indicative of the phase difference between said two light beams;

a second detector which receives the other light beam that has propogated around said loop in said one direction and the other light beam that has propogated around said loop in said opposite direction and produces a second output signal indicative of the phase difference between said two other light beams; and means for comparing said first and second output signals and generating a signal indicative of the phase difference between said output signals.

12. The rotation rate sensor of claim 11 wherein the two light beams received at each of said detectors are of the same frequency, respectively.

13. The rotation rate sensor of claim 11 wherein one of the light beams received at each of said detectors is at said first frequency and the other light beam is at said second frequency.

* * * * *